United States Patent

[11] 3,522,847

[72] Inventor: Robert V. New
2501 Cedar Springs Road, Dallas,
Texas 75201
[21] Application No.: 724,002
[22] Filed: April 25, 1968
[45] Patented: Aug. 4, 1970

[54] APPARATUS FOR CLEANING HEAT AMPLIFICATION BY STIMULATED EMISSION OF RADIATION
7 Claims, 2 Drawing Figs.

[52] U.S. Cl. .............................................. 166/60,
166/68, 166/303, 166/311
[51] Int. Cl. .................................................. E21b 43/24
[50] Field of Search ....................................... 166/39, 40,
11, 57, 60, 75, 177; 175/16, 11; 219/277, 278,
121P; 331/94.5; 166/272, 302, 303, 311, 67, 68

[56] References Cited
UNITED STATES PATENTS

| | | | |
|---|---|---|---|
| 1,457,479 | 6/1923 | Wolcott......................... | 166/39X |
| 2,134,610 | 10/1938 | Hogg.............................. | 166/60 |
| 2,670,801 | 3/1954 | Sherborne..................... | 166/177X |
| 2,685,930 | 8/1954 | Albaugh........................ | 166/39 |
| 2,757,738 | 8/1956 | Ritchey......................... | 166/60X |
| 2,923,535 | 2/1960 | Ljungstrom................... | 166/11X |
| 2,954,826 | 10/1960 | Sievers.......................... | 166/60 |
| 3,004,137 | 10/1961 | Karlovitz....................... | 175/16X |
| 3,140,421 | 7/1964 | Spongberg..................... | 219/121(P)X |
| 3,313,359 | 4/1967 | Ross et al...................... | 175/11 |

OTHER REFERENCES

Am. Inst. of Physics. Glossary of Terms Frequently Used Concerning Lasers. Pub. R-166, 5/5/64, p. 16. TK 7872.L3 A48

Van Nostrand's Scientific Encyclopedia, 4th Ed., 1968, pp. 1083 and 1084. Q 121.V3

Primary Examiner— Marvin A. Champion
Assistant Examiner— Ian A. Calvert
Attorney—Strauch, Nolan, Neale, Nies and Kurz ABSTRACT: Portable apparatus for the cleaning of a cased well-bore and its attendant equipment and the immediately adjoining natural oil and/or gas reservoir by use of heat by utilizing gases herein set forth of suitable energy levels, and an electromagnetic wave transducer for exciting the atoms and molecules of the gas (i.e., to establish interaction between the gas and the electromagnetic waves effecting "population inversion" or "collision, second kind ") to emit radiation in the infrared sector of the electro-magnetic spectrum.

Patented Aug. 4, 1970
3,522,847
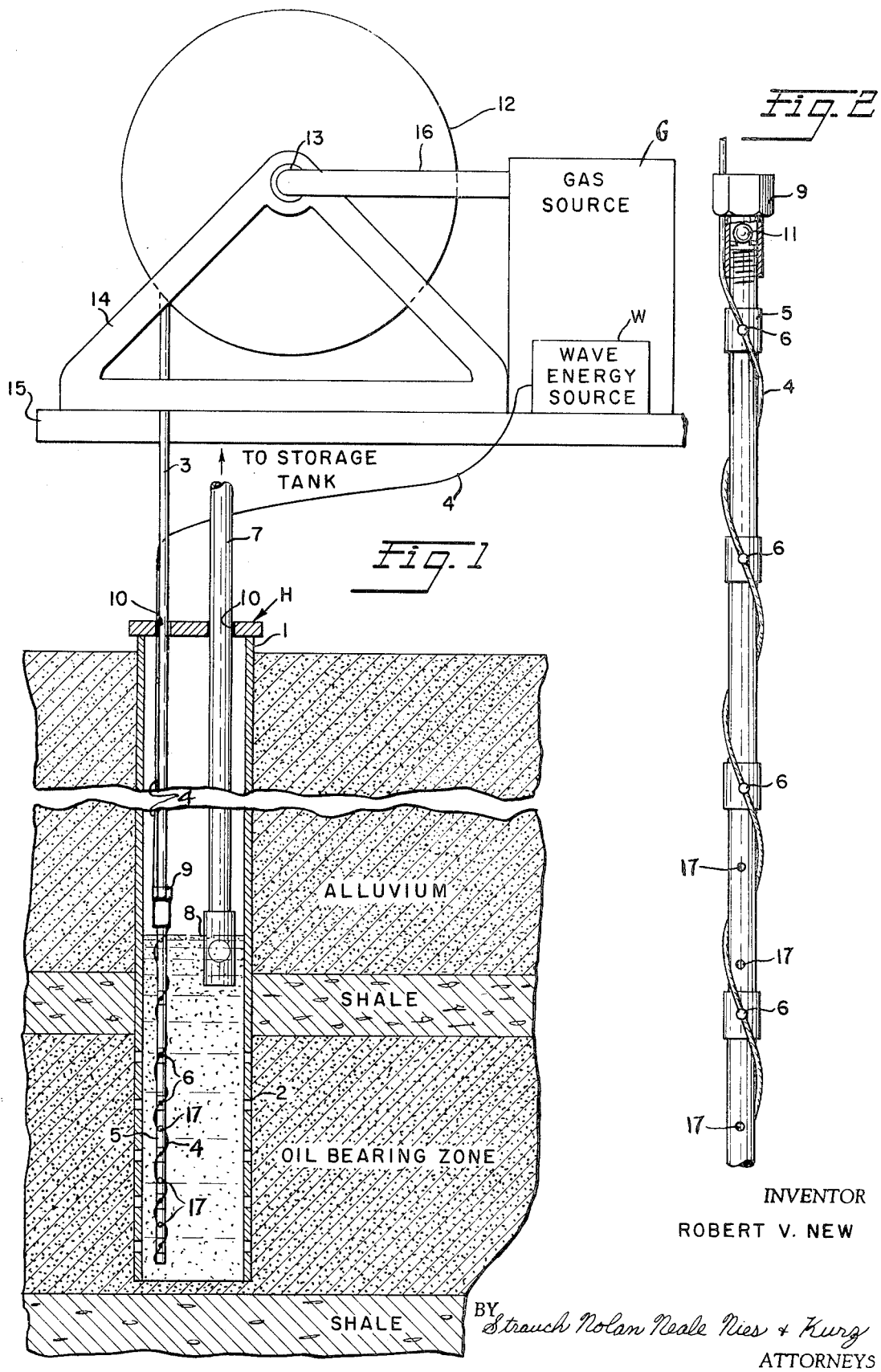
INVENTOR
ROBERT V. NEW
BY Strauch Nolan Neale Nies & Kurz
ATTORNEYS

U.S. PATENT 3,522,847
APPARATUS FOR CLEANING HEAT AMPLIFICATION BY STIMULATED EMISSION OF RADIATION

BACKGROUND OF THE INVENTION

The subject invention concerns new, novel, efficient and economical methods of removing substances and conditions that inhibit production of hydrocarbons from porous and permeable natural reservoirs in the earth, through the use of new and unique designs of certain apparatus to materially assist in practicing the methods.

It is well known in the science of petroleum engineering that cased well-bores and their attendant equipment (such as the perforations in the casing, valves, tubing, etc.) as well as the natural reservoir formation immediately adjacent to the wellbore, often become contaminated with material and by conditions that inhibit production from the well; among the accumulating substances that so act to defeat efficient and profitable maximum production are substances such as paraffin, sludge (which may be asphaltic material in which detrital material may accumulate together with emulsifying water), salt and/or salts, gypsum, metallic oxides (such as rust accumulation in the pipe perforations), scale and other undesirable solids. Also, water-block (consisting of connate water, or intrusional water such as water from the drilling-mud) may prevail immediately adjoining the well bore, that is within a distance of perhaps two feet, thus inhibiting production.

Injection of inert gas and heat radiation as herein described will vaporize the water-block, melt the paraffin, and remove all the above said production inhibitors by a combination of the mechanical, erosive, and dissolving forces created by the temperature elevation and the physical changes produced in the contaminates.

SUMMARY OF THE INVENTION

My invention utilizes the introduction of gas selected from the monatomic nonvalent group, i.e., helium, neon, argon, krypton, xenon, radon, and also nitrogen and carbon dioxide, and/or mixtures of two or more thereof, through an electromagnetic wave transducer, into a cased well-bore and the adjoining oil and/or gas bearing natural reservoirs, in a manner to cause such gases to be excited by the electromagnetic waves thereby effecting a super-heating of the gases causing them to emit infra-red radiation as they pass into and through the well-bore and into the natural reservoir.

An important object of my invention is to provide new, novel, economical and efficient apparatus to create heat energy within a cased well-bore and adjacent natural reservoirs containing oil and/or gas, in a form to better effect removal of production inhibitors therefrom.

An important object of my invention is to provide new, novel, simplified, efficient and economical portable apparatus to carry out the methods of the preceding object.

A most important object of my invention is to utilize the energy levels of one, or a mixture of two or more, of the gases herein set forth when excited by the action of electro-magnetic waves as herein described to effect a continuous emission of infra-red (heat) radiation resultant super-heated gases as they pass into and through the transducer into cased well-bore and the immediately adjoining oil or gas bearing natural reservoir. Certain of these gases, and mixtures thereof, of suitable energy levels (such as Helium and Neon, or Carbon Dioxide and Argon, or Carbon Dioxide and Nitrogen, or other suitable mixtures) will become super-heated (in the order of 1000°F, or more if desired) and emit infrared radiation when excited by application of optimum electromagnetic wave energy.

An important object of my invention is to provide an efficient, simple, economical, and easily portable apparatus to create gas and electromagnetic waves and interact them in a transducer so as to impact the electromagnetic waves upon the gas to cause ionization of the gas as it descends through the transducer.

BRIEF DESCRIPTION OF THE DRAWINGS

Further objects of the invention will appear from the following description and appended claims when read in connection with the accompanying drawings wherein:

FIGURE 1 illustrates schematically in partial cross-section a conventionally completed well in a natural oil bearing reservoir fitted with suitable apparatus for practicing this invention; and FIGURE 2 is an enlarged schematic elevational view of the transducer employed in the apparatus of FIGURE 1.

DESCRIPTION OF PREFERRED EMBODIMENT

With continued reference to the drawings wherein the same reference numerals are employed throughout to indicate the same parts, the method of this invention can be practiced with a wide variation in apparatus. Figure 1 illustrates a preferred adaptation of the invention to such a conventionally completed well to apply the invention. In such a well adaptation, the solid casing 1 conventionally extends from the surface to the top of the oil bearing zone, perforated casing 2 conventionally extends through the oil bearing zone, and a conventional well-head H providing multiple access openings 10 is provided for closing the casing and for insertion and removal of tubing, wire-line appliances, and other production well apparatus in well known manner. In the illustration of FIGURE 1, a production tubing 7 carrying a pump 8 at its lower end is shown extending through one access opening 10 while a flexible or coilable conduit or hose 3 of any suitable material is introduced through another access opening 10 into casings 1 and 2 and carries a male fitting (not shown) at its free end for coupling to a female fitting 9 mounting an anti-back flow check valve 11 carried by the open ended tubular element of a transducer 5 of any suitable construction, for example, the type shown in my copending application Serial No. 641,825 filed May 29, 1967 and entitled "Method And Apparatus For Oil Production Amplification By Stimulated Emission Of Radiation". Conduit 3 is normally coiled upon itself on a power operated reel 12 journalled through hollow shaft 13 forming a centered gas inlet connection on a triangular support stand 14 preferably fixedly mounted on the rear end of a flat bed 15 of a wheeled vehicle, such as a truck or trailer, (not shown) together with a wave energy source W connected by electrical cable 4 to electrodes 6 of transducer 5 and a gas source G connected to reel inlet connection 13 by a conduit 16 to assure ready portability. While any suitable wave energy source W and gas source G that can be readily transported by truck, trailer, or the like from well to well as the need for cleaning appears may be provided, particularly suitable equipment is disclosed in my copending application Serial No. 712,510 filed March 12, 1968 and entitled "Apparatus For Production Amplification By Stimulated Emission Of Radiation". This application discloses an internal combustion engine generating exhaust gas as a gas supply source and providing a power source for driving an AC electrical generator for producing the required wave energy. The internal combustion engine, AC electrical generator and their accessories as shown in this copending application are ideally adapted for flat bed mounting and by the addition of a suitable gear box of well known construction the internal combustion engine output shaft can be connected to alternately drive reel 12 to raise and lower conduit 3 and its attached transducer 5 and to drive the AC generator in practicing this invention.

Gas, which may be one set forth herein or an optimum mixture of helium and neon, or carbon dioxide and argon, or carbon dioxide and nitrogen (exhaust gas), or other suitable mixtures, is pumped through inlet connection 13 into conduit 3 at the surface and is conducted therethrough and flows past check-valve 11 into transducer 5. Inserted through transducer 5 are electrodes 6 the output of which impacts ionizing electromagnetic waves (in the radio frequency range) into the flowing gas which waves are generated by a suitable wave energy source. Expulsion of the products of the inhibiting mass, and thereafter production of products is through pump 8 and tubing 7.

As the gas moves through transducer 5 each successive electrode 6 re-enforces the electron impact effect thus intensifying the interaction of the electromagnetic waves and the atoms and molecules of the gas or mixture of gases resulting in tremendous emissions of radiation in the infrared (heat) sector of the electromagnetic spectrum (in the order of 10 trillion electrical impulses per second) effective to heat the cased well-bore, and its attendant apparatus and the natural hydrocarbon reservoir. Transducer 5 may be open at its bottom and/or perforated at selected points, for example at 17 below the uppermost electrodes 6 disposed opposite pump 8 (FIGURE 1 ), if desired, to assure direct application of the radiated heat to casing 2, its attendant apparatus and the inhibitor mass therein and in the surrounding reservoir area through the introduction of the super-heated gases thereinto.

The transducer of this invention is designed to apply to such gases a series of repeated electromagnetic impacts at preselected intervals, each successive impact re-enforcing the excitation upon said gases to effect maximum radiation in the infrared (heat) sector of the electromagnetic spectrum. Thus the transducer subjects the gas or mixture of gases to electromagnetic wave impacts which cause out-put radiation emissions at frequencies millions of times greater than the in-put frequencies.

As the temperature rise required in the procedure is relatively moderate (perhaps 500°F) and the heat absorbing characteristics of the inhibiting mass is relatively high, the heat absorption negates the need of any mechanical cooling equipment as in a reflector laser instrument. As the inhibitor mass, and in turn the reservoir matrix, absorbs the infrared (heat) emissions from the super-heated gases the total purpose of the emissions is accomplished. The cased well-bore and its attendant equipment and the adjacent formation is cleaned of production inhibitors.

Of utmost importance to the present invention, the gas or mixture of gases passes down the flexible tubing from the surface to the transducer where the gas or mixture of gases is subjected to ionizing electromagnetic wave impacts at one or a multiplicity of times and places as it travels through the transducer to cause excitation of the atoms and molecules of said gas or mixture of gases, thus creating super-heated (ionized) gas and attendant emission of radiation in the infrared (heat) sector of the electromagnetic spectrum. In this way the transducer can be made to operate so as to control the frequency and intensity and to re-enforce the atom-molecule-electromagnetic-wave-interaction by pre-selecting the placement of the electrodes along the transducer to impact the mixture of gases.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for cleaning and removing production inhibiting substances from a completed cased production well and the immediately adjoining area of the natural reservoir comprising a source of inert gas; conventional oil production pump and tubing means in said cased well; means for flowing the gas from said source to the interior of the cased well-bore including conduit means in communication with the wellbore; a source of electrical wave energy; and means for conveying electric wave energy from said source of electrical wave energy to the interior of said conduit means including discharge electrode means arranged at longitudinally spaced intervals therealong to apply a series of electromagnetic impacts to the flowing gas at preselected intervals to repeatedly re-enforce the excitation of the atoms and molecules of the gas thereby effecting a continuous emission of radiation in the infrared sector of the magnetic spectrum to heat the cased well-bore, its attendant apparatus including said conventional oil production pump and tubing means and the immediately adjoining area of the natural reservoir to a sufficiently high temperature to effect a melting or spalling of the hardened inhibitors, vaporization of the connate and intrusional water, and mechanical disintegration and dissolution of the frangible metallic oxides and scale, said oil production pump and tubing means being operative to remove the freed inhibitors from the well clearing the well for normal oil production operation upon cessation of the operation of and removal of the conduit means and its electrode means from the well.

2. The apparatus of Claim 1 wherein the source of inert gas, the means for flowing gas from said source to the interior of the cased well, said source of electrical wave energy and the means for conveying electrical energy from said source of electrical energy to the interior of said conduit means are mounted on the flat bed of a wheeled vehicle for ready movement to and from wells requiring cleaning.

3. The apparatus of Claim 2 wherein the means for flowing gas from said source to the interior of the cased well comprises a coilable length of tubing, a reel and stand assembly fixed to said flat bed including a tubular reel shaft interconnecting said source of inert gas and one end of said length of coilable tubing and normally supporting said length of tubing coiled upon itself around said reel shaft, and said conduit means includes coupling means at one end for removably connecting said conduit means to the other end of said coilable length of tubing.

4. The apparatus of Claim 3 wherein said coupling means is provided with an anti-back flow check valve preventing retrograde flow from said conduit means to said coilable length of tubing.

5. The apparatus of Claim 3 wherein said means for conveying electrical energy from said source of electrical wave energy to the interior of said conduit means comprises a length of electrical cable means having one end connected to said source of electrical wave energy and its other end connected at spaced intervals to said electrode means to serve as a common lead, said length of electrical cable means being of sufficient length to match the length of said tubing thereby assuring concurrent entry of said cable means into said well casing as the conduit means at the other end of said coilable length of tubing is lowered into the well casing during rotation of the reel of the reel and stand assembly in a direction to feed the tubing into the cased well.

6. The apparatus of Claim 1 wherein said conduit means is in communication with the cased well-bore through its open outlet end.

7. The apparatus of Claim 6 wherein said conduit means is in communication with the cased well-bore through perforations at selected points to apply the radiated heat directly to selected areas within the cased well-bore.